United States Patent [19]

Konishi et al.

[11] Patent Number: 4,596,841

[45] Date of Patent: Jun. 24, 1986

[54] COMPOSITION FOR BONDING METAL POWDERS COMPRISING ALKYL (METH)ACRYLATES POLYMERS HAVING 3–12 CARBON ATOMS IN THE ALKYL SUBSTITUENT AND A TG −70° TO −10° C. FOR THE POLYMERS

[75] Inventors: Toshiharu Konishi; Yoshiki Kobayashi; Takefumi Shimomura; Yukio Shimizu, all of Osaka, Japan

[73] Assignee: Nitto Electric Industrial, Osaka, Japan

[21] Appl. No.: 705,264

[22] Filed: Feb. 25, 1985

[30] Foreign Application Priority Data

Feb. 24, 1984 [JP] Japan .................................. 59-34886

[51] Int. Cl.⁴ ..................... B22F 1/00; C08L 33/08; C09J 3/14; C08K 3/08
[52] U.S. Cl. ..................... 523/410; 523/412; 524/270; 524/272; 524/413; 524/440; 524/499; 524/505; 524/508; 524/513; 524/514; 524/517; 524/522; 524/523; 524/533; 524/549; 524/560; 524/555
[58] Field of Search ............... 524/440, 560, 533, 505, 524/499, 523, 549, 270, 272, 517, 508, 514, 513, 413, 522, 555; 523/410, 412

[56] References Cited

U.S. PATENT DOCUMENTS 3,403,009  9/1968  Bergstrom .................. 29/182.7
4,230,748 10/1980  Patel ........................ 427/423

OTHER PUBLICATIONS

Derwent Abs., 84-211177/34 (J59123848-A) (7-84) Matsushita.
Derwent Abs., 52584C/30 (J55078032) (6-80) Unitika KK.
Derwent Abs., 83-805462/44 (J58162680-A) (9-83) Koyo Sangyo.
Derwent Abs., 88257B/49 (J54138048) (10-79) Toyo.
Derwent Abs., 20520E/11 (J57021473) (2-82) Modern Plastics.
Derwent Abs., 52194A/29 (J53065220) (6-78) Nippon.
Derwent Abs., 10706E/06 (J56167748) (12-81) Mitsubishi.

*Primary Examiner*—Herbert J. Lilling
*Attorney, Agent, or Firm*—Sughrue, Mion, Zinn, Macpeak & Seas

[57] ABSTRACT

A composition for bonding metal powders which is used in an amount of at most about 7 parts by weight as the solids content per 100 parts by weight of a metal powder for obtaining a flexible metal powder molding which is capable of tolerating deformation at a radius of curvature of up to 15 mm, the composition comprising as a main monomer an acrylic polymer having a weight average molecular weight of about 50,000 to 1,500,000 which comprises alkyl (meth)acrylate having an average carbon atom number of 3 to 12 in the alkyl moiety, or a mixture of the acrylic polymer and a resin which gives adhesive property, as a main component, the main component having a glass transition temperature in a range of about −70° to −10° C. and an elastic modulus in a range of about 0.05 to 50 kg/cm² at 25° C.

10 Claims, No Drawings

COMPOSITION FOR BONDING METAL POWDERS COMPRISING ALKYL (METH)ACRYLATES POLYMERS HAVING 3-12 CARBON ATOMS IN THE ALKYL SUBSTITUENT AND A TG −70° TO −10° C. FOR THE POLYMERS

FIELD OF THE INVENTION

The present invention relates to a composition for bonding metal powders which is used to obtain metal powder moldings such as sheet materials composed of a metal powder and a composition for bonding the metal powder, or other analogous articles. More particularly, it relates to a composition for bonding metal powders which can be used in a small amount based on the metal powder and can form flexible metal powder moldings which are capable of tolerating deformation at a radius of curvature of up to about 15 mm, wherein the resulting moldings can be converted into a metal layer having a high density after sintering.

BACKGROUND OF THE INVENTION

Hitherto, in order to give special properties such as wear resistance or corrosion resistance on the surface of a metal base material, it is often carried out to form a metal coating layer having excellent those properties on the surface of the base material.

In many cases, the metal coating is formed in the form of layer on the base material by applying a flexible metal powder molding comprising a metal powder, a binder, a plasticizer and a solvent to the metal base material and thereafter sintering it, whereby the sintered metal coating layer is metallurgically bonded to the base material. In a rare case, a metal strip for covering is prepared previously by sintering the same metal powder molding as described above, and such is bonded to the metal base material by a physical means such as screws or an adhesive, etc. to form the metal coating.

In the case that a metal powder molding is metallurgically bonded to the surface of a metal base material by sintering after adhering the molding to the surface of the above-described base material, it is necessary that the metal powder molding has good flexibility which is capable of transforming so as to fit on a curved face of the base material without causing troubles of obstructing practicability such as generation of cracks, etc. Further, in the case of obtaining a metal strip for covering which is previously sintered in a prescribed shape, it is necessary that the metal powder molding prior to sintering has flexibility which is capable of transforming by processing in the prescribed shape without causing the same troubles as described above.

In addition, this kind of metal powder molding is required to have not only good flexibility which is excellent in deformation property such as the above-described fitting deformation property or processing deformation property, but also sufficient strength for handling. Moreover, the metal powder molding is required to form a coating layer having a high density by sintering without causing contraction which is not admitted, or openings which are called cavities.

Hitherto, as this knind of moldings, compositions comprising resins such as polyvinyl ether, or methyl cellulose resin as a main component, to which a volatile plasticizer such as dibutyl phthalate, glycerine or wax, etc. is added as an agent to improve the flexibility of moldings, have been described in, for example, Japanese Patent Application (OPI) Nos. 91910/74 and 35703/81 (the term "OPI" as used herein refers to a "published unexamined Japanese patent application"), Japanese Patent Publication No. 11167/70, etc.

However, the above-described plasticizers rapdily volatilze in the sintering process, because they have generally a low boiling point as compared with the abovedescribed main component. Therefore, they generate gas in an early stage of the sintering process and there is the possibility of causing numberless openings on the coating layer after sintering. Accordingly, it is necessary to reduce a temperature-raising rate during sintering as slow as possible.

Moreover, use of plasticizers have not only problems that they deteriorate strength of moldings and easily form cracks in handling, but also a problem that the coating layer after sintering is difficult to have a high density.

SUMMARY OF THE INVENTION

As a result of extensive investigations in view of such problems in the prior art, the present invention has been completed.

Accordingly, one object of the present invention is to provide a composition for bonding metal powders which is used to obtain metal power moldings useful for metallurgically bonding a metal coating layer ot a metal base material.

Another object of the present invention is to provide a composition for bonding which can be used as metal powder moldings in case of forming a metal coating layer by physical bonding means.

The composition for bonding metal powders which can form metal moldings according to the present invention has good flexibility and good strength or elongation and can form a metal layer having a high density after sintering, without using plasticizers and, consequently, without causing the above described problems due to the plasticizers.

the composition for bonding metal powders according to the present invention is used in an amount of at most about 7 parts by weight as the solids content based on 100 parts by weight of a metal powder for obtaining a flexible metal powder molding which is capable of tolerating deformation at a radius of curvature of up to about 15 mm and the composition comprises an acrylic polymer having a weight average molecular weight of about 50,000 to 1,500,000 which comprises an alkyl (meth)acrylate monomer having an average carbon atom of 3 to 12 in the alkyl moiety, or a mixture of the acrylic polymer and a resin which gives adhesive property, as a main component, the main component having a glass transition temperature in a range of about −70° to −10° C. and an elastic modulus in a range of about 0.05 to 50 kg/cm$^2$ at 25° C.

DETAILED DESCRIPTION OF THE INVENTION

The greatest characteristic of the composition according to the present invention is to use a specific acrylic polymer or a mixture of the polymer and a resin which gives adhesive property, as a main component. According to this main component, it is possible to produce a metal powder molding having excellent flexibility which is capable of transforming so as to well fit on a surface of a metal base material having a radius of curvature of up to 15 mm without causing trouble of cracking or capable of transforming, as a separated state from the base material, so as to process in a suitable curved shape having the same radius of curvature as described above, even if the solid content of the composition to the metal powder is small as described above or the above-described prior plasticizer is not substantially used.

Further, this metal powder molding has excellent strength and elongation characteristics and forms a metal layer having a high density after sintering, because the amount of the composition uses is small and the plasticizer is not used. Therefore, the metal powder molding can show excellent performances as a coating layer on the surface of the metal base material.

The acrylic polymer used in the present invention is one which is prepared by polymerizing or copolymerizing one or more of alkyl (meth)acrylates having an average carbon atom number of 3 to 12 in the alkyl moiety as main monomers.

The main monomers have a function of reducing the amount of gas generated when sintered by heat treatment at high temperature, thereby preventing generation of swelling, etc. in the metal layer after sintering. If the average carbon atom number in the alkyl moiety is below 3 or beyond 12, there are problems that adhesion bonding property becomes poor and flexibility lacks.

Examples of the main monomers are esters of acrylic acid or methacrylic acid wherein the alkyl group of aliphatic alcohols is methyl group, ethyl group, butyl group, isobutyl group, hexyl group, heptyl group, octyl group, isooctyl group, 2-ethylhexyl group, etc.

The present invention can also use acrylic polymers in which polymerizable monomers having a functional group in the molecule are used together with the above-described main monomers. The polymerizable monomers having a functional group provide a good result of improving adhesive strength of the composition at room temperature. The proportions of the monomers used are about 80 to 99.5% by weight, preferably 90 to 98% by weight, of the main monomer and about 20 to 0.5% by weight, preferably 10 to 2% by weight, of the above-described monomer, so that polymers having flexibility and a tensile strength of about 350 to 2,000 g/20 mm (drawing rate: 300 mm/minute, condition; 20° C.×60% R.H.) are obtained. If the amount of the above-described monomer is small, the above-described effects are poor. If the amount thereof is too large, there is the possibility of generating swelling, etc. in the metal layer after sintering.

Examples of such polymerizable monomers include α-mono- or diolefin carboxylic acids such as (meth)acrylic acid, crotonic acid, maleic acid, itaconic acid, phenolic acid, fumaric acid, etc. which have carboxyl group as the functional group; 2-hydroxyethyl methacrylate, 2-hydroxypropyl (meth)acrylate, 1-methyl-2-hydroxyethyl (meth)acrylate, 2-hydroxyvinyl ether, etc. which have hydroxyl group as the functional group; glycidyl (meth)acrylate which has epoxy group as the functional group; N-methylol (meth)acrylamide which has methylol group as the functional group; and N,N-dimethylaminoethyl (meth)acrylate, N-tertiary butylaminoethyl (meth)acrylate, N-tertiary butylaminobutyl (meth)acrylate, etc. which have amino group as the functional group.

Of these, α-mono- or diolefin carboxylic acids are particularly preferred in that they form a metal complex to obtain a flexible sheet having a tensile strength of about 700 to 2,000 g/20 mm.

The acrylic polymer must have a weight average molecular weight of about 50,000 to 1,500,000, preferably 300,000 to 1,200,000. If the weight average molecular weight is less than about 50,000, the bonding force to metal powders lacks to cause deterioration of strength of the moldings or make difficult to high density after sintering. If the weight average molecular weight is more than about 1,500,000, working properties in obtaining the molding is poor.

In the present inventin, the above-described acrylic polymer can be used alone or can be used together with a resin which gives adhesive property. The resin which gives adhesive property mainly contributes to improvement of adhesive force of the molding at room temperature. The amount of the resin is preferably 50 to 99.8% by weight based on the weight of the acrylic polymer and 50 to 0.2% by weight based on the weight of the resin which gives adhesive property. If the amount of the resin which gives adhesive property is too small, the above-described effect cannot be obtained, and if the amount is too large, the above-described characteristics of the acrylic polymer are damaged.

Examples of such resins which give adhesive property include alkylphenol resin, coumarone-indene resin, polyterpene resin, rosin resin, petroleum resin, polyvinyl ether resin, terpene phenol resin, xylene resin, epoxy resin, polyester resin, polyimide resin, polyamide resin, etc.

The composition for bonding metal powders of the present invention comprises the above-described acrylic polymer or a mixture of the acrylic polymer and the resin which gives adhesive property, as a main component. If desired and necessary, various additives such as xylene resin, paraffin wax, process oil, and abietyl alcohol as softening agents; or calcium carbonate, silica and talc as fillers; etc., can be added. Further, if desired and necessary, anionic, cationic or nonionic surfactants can be added as a stabilizer against the passage of time in an amount of about 0.01 to 5 parts by weight per 100 parts by weight of the main component. The addition of the surfactant effectively prevent deteriorating the softeness of a molding due to the modification of the molding with the passage of time. The main component (acrylic polymer or the acrylic polymer and resin which gives adhesive property) must have a glass transition temperature in a range of about −70° to −10° C., preferably −65° to −30° C. The polymer main component having a glass transition temperature of less than about −70° C. is difficult to be economically available and has a problem that sufficient strength cannot be obtained because such is too soft. On the other hand, if the glass transition temperature of the main component is higher than about −10° C., a flexible molding which is capable of tolerating deformation at a radius of curvature of about 15 mm cannot be obtained.

Further, together with the glass transition temperature, the main component in the above-described composition of the present invention must have an elastic modulus in a range of about 0.05 to 50 kg/cm$^2$, preferably 0.2 to 30 kg/cm$^2$, at 25° C., and as a result, the effect of the present invention can be first exhibited. If the elastic modulus is below about 0.05 kg/cm$^2$, the molding easily causes defects such as cracks when it is handled or transformed due to the lack of strength or elongation (10 to 180%) and, consequently, a metal layer having high density cannot be obtained by sintering, because a large amount of the composition must be used for molding. On the other hand, if the elastic modulus is above about 50 kg/cm², it becomes difficult to obtain a flexible molding which is capable of tolerating deformation at a radius of curvature of up to about 15 mm.

The above-described elastic modulus means a value of tangent modulus when a sample is drawn at a chuck distance of 50 mm at a rate of 300 mm/minute at a measuring temperature of 25° C. The calculating formula thereof is as follows.

$$\text{Elastic modulus} = F/S$$

wherein
F: Force at a point of intersection of the point at which the sample is stretched by 100% and the tangent line (kg/cm²).
S: Sectional area of the sample.

A process of obtaining a metal powder molding such as sheet material for another analogous article using the composition for bonding metal powders according to the present invention is explained below.

A process which comprises preparing a solution of the above-described composition with a suitable organic solvent such as acetone, toluene, methyl ethyl ketone, etc., adding the above-described metal powder to the solution in such an amount that the solids content of the composition is at most about 7 parts by weight, preferably 1.0 to 5.5 parts by weight, per 100 parts by weight of the metal powder kneading the mixture, casting the mixture into a mold covered with a releasing paper, evaporating the solvent, and then molding in sheet or another shape by passing through rolls for rolling is suitably employed. Press molding may be carried out by mixing without using the solvent, if desired and necessary, with heating or in vacuum with heating.

In the above-described process, if the amount of the composition of the present invention is larger than about 7 parts by weight as the solids content per 100 parts by weight of the metal powder, it becomes difficult to obtain a metal layer having a high density after sintering and pollution of the sintering furnace occurs by the resin components gasified during sintering processing.

As metal powders, various kinds of metal powder depending upon the properties which should be given to the surface of the metal base material, such as self-melting alloy powder, wear-resisting alloy powder, etc. can be used. Examples of the metal powders are Fe-M-C system multi-component eutectic alloy powders which are wear-resisting alloy powders. M in the above Fe-M-C system includes at least one of Mo, B and P as a major component an may contain Cr, V, W, Nb, Ta, and Ti as secondary elements. It may further contain Si, Ni, Mn, etc. as other elements. Such multicomponent eutectic alloy powders have a characteristic that the sintering temperature is comparatively low, the liquid phase is about 10 to 50% by weight in a temperature range of 1,000 to 1,150° C. and the liquid phase has a good wetting property to the base material.

These alloy powders preferably have a particle size of 150 meshes or less in view of the fact that the particle size greatly affects the porosity after sintering. If the particle size is larger than the above-described value, it becomes difficult to form an alloy layer having a high density.

The metal powder molding formed by the above-described process is shaped into a sheet material generally having a thickness of about 0.3 to 5 mm, which shows a good flexibility which is capable of tolerating deformation at a radius of curvature of up to about 15 mm and has excellent strength and elogation.

In the case of using this molding material, such is adhered on the surface of the metal base material through or without using a suitable adhesive layer so as to fit it on the surface by deformation and, thereafter, the assembly is subjected to sintering processing under a suitable temperature condition according to the kind of metal powder. Alternatively, after the above described molding is transformed appropriately by processing and is subjected to sintering processing by the same manner as described above, the sintered product is bonded to the surface of the metal base material by a mechanical means. The above-described sintering processing is generally carried out with heating under a non-oxidizing atmosphere in order to prevent deterioration of the metal powder caused by oxidation.

The formed metal layer after sintering has a high density due to the above-described composition of the present invention used for forming the molding, and inherent performances such as prevention of wear or corrosion, etc. of the surface of the metal base material can be well exhibited.

The metal powder moldings using the composition for bonding metal powders of the present invention can be applied as a surface modifying layer of the base material for tools, machines, electric elements and automobiles, while utilizing the above-described characteristics, and can be applied as raw materials for rods or pipes having a desired shape, sheets or articles having a special shape. Furthermore, the metal powder moldings can be utilized in an unsintered form as barrier materials such as a material for shielding electromagnetic wave while utilizing characteristics thereof, such as tensile strength, elongation, flexibility, etc.

The present invention is described in greater detail by reference to the following non-limiting examples. In the following examples, "part" and "%" mean "part by weight" and "% by weight", respectively.

EXAMPLE 1

| 2-Ethylhexyl acrylate | 92 parts |
|---|---|
| Ethyl acrylate | 5 parts |
| Acrylic acid | 3 parts |
| Toluene | 150 parts |
| Benzoyl peroxide | 0.3 part |

The above-described each component was fed in a reactor. The mixture was subjected to polymerization reaction at 65° C. for 9 hours to obtain a solution containing an acrylic copolymer having a weight average molecular weight of 600,000. This solution was used as the composition for bonding metal powders of the present invention. The above-described acrylic copolymer in the compositon had a glass transition temperature of −64° C. and an elastic modulus of 0.6 kg/cm² at 25° C.

Then, 3 parts of the above-described composition were added to 100 parts of an iron alloy powder passing through a 250 mesh screen. The resulting mixture was kneaded by a wet process using acetone as a solvent and rolled using rolls to produce an alloy powder sheet having a thickness of 1.2 mm and a density of 4.8 g/cm³ which was flexible and had a tensile strength of 1,100 g/20 mm.

EXAMPLE 2

| Butyl acrylate | 98 parts |
| --- | --- |
| Hydroxyethyl acrylate | 2 parts |
| Ethyl acetate | 100 parts |
| Benzoyl peroxide | 0.2 part |

The above-described each component was fed in a reactor. The mixture was subjected to polymerization reaction at 70° C. for 9 hours to obtain a solution containing an acrylic copolymer having a weight average molecular weight of 450,000. To this solution, a phenol resin which gives adhesive property was added in an amount of 30 parts per 100 parts of the acrylic copolymer. The main component composed of the above-described acrylic copolymer and the resin which gave adhesive property in the composition had a glass transition temperature of −55° C. and an elastic modulus of 0.4 kg/cm² at 25° C.

Then, 4 parts of the above-described composition were blended with 100 parts of an iron alloy powder passing through a 150 mesh screen, and the same procedure as in Example 1 was carried out to produce an alloy powder sheet having a thickness of 1.5 mm and a density of 4.5 g/cm³ which was flexible and had a tensile strength of 450 g/20 mm.

EXAMPLE 3

| Isooctyl acrylate | 60 parts |
| --- | --- |
| Isobutyl acrylate | 39 parts |
| Glycidyl metacrylate | 1 part |
| Toluene | 120 parts |
| Benzoyl peroxide | 0.2 part |

The above-described each component was fed in a reactor. The mixture was subjected to polymerization reaction at 75° C. for 8 hours to obtain a solution containing an acrylic copolymer having a weight average molecular weight of 600,000. This solution was used as the composition for binding metal powders of the present invention. The above-described acrylic copolymer in the composition had a glass transition temperature of −53° C. and an elastic modulus of 2.0 kg/cm² at 25° C.

Then, 2 parts of the composition was blended with 100 parts of an iron alloy powder passing through a 350 mesh screen, and the same procedure as in Example 1 was carried out to obtain an alloy powder sheet having a thickness of 0.8 mm and a density of 4.4 g/cm³ which was flexible and had a tensile strength of 600 g/20 mm.

In order to examine performance of alloy powder sheets obtained in Examples 1 to 3, each sheet was cut into a size of 1 cm × 5 cm, and the following tests (1) and (2) were carried out.

(1) A cut sheet was wound on a steel pipe having a radius of 20 mm, and changes of the surface of the sheet were examined.

(2) After a cut sheet was wound on the same steel pipe as in (1) above, it was subjected to sintering processing, and the state of the surface and density of the sheet after sintering were examined.

As the result of the above-described tests, generation of cracks and swellings were not observed in each sheets of Examples 1 to 3 in both tests (1) and (2). In addition, it was understood that, in each sheet of Examples 1 to 3, an alloy layer having a high density of 7.2 or more could be formed by carrying out the sintering processing of the test (2).

While the invention has been described in detail and with reference to specific embodiments thereof, it will be apparent to one skilled in the art that various changes and modifications can be made therein without departing from the spirit and scope thereof.

What is claimed is:

1. A metal powder molding composition comprising a metal powder and a bonding composition useful or obtaining a flexible metal powder molding which is capable of tolerating deformation at a radius of curvature of up to about 15 mm, said bonding composition comprising as a main component an acrylic polymer having a weight average molecular weight of about 50,000 to 1,500,000 which is polymerized from an alkyl (meth)acrylate monomer having an average carbon atom number of 3 to 12 in the alkyl moiety and optionally containing a resin giving an adhesive property in admixture with said acrylic polymer, said main component having a glass transition temperature in a range of about −70° to −10° C. and an elastic modulus in a range of about 0.05 to 50 kg/cm² at 25° C., and said metal powder molding composition comprising 1.0 to 7 parts by weight as a solid content per 100 parts by weight of the metal powder.

2. The composition of claim 1, wherein said acrylic polymer is an acrylic copolymer comprising about 80 to 99.5% by weight of an alkyl (meth)acrylate monomer having an average carbon atom number in a range of 3 to 12 in the alkyl moiety and about 20 to 0.5% by weight of a polymerizable monomer having a functional group in the molecule.

3. The composition of claim 2, wherein the polymerizable monomer having a functional group in the molecule is α-mono- or di-olefin carboxylic acid.

4. The compositon of claim 1, wherein the main component is a mixture of 50 to 99.8% by weight of the acrylic polymer and 50 to 0.2% by weight of the resin which gives adhesive property.

5. The composition of claim 1, wherein the resin which gives adhesive property is selected from the group consisting of alkylphenol resin; coumarone-indene resin, polyterpene resin, rosin resin, petroleum resin, polyvinyl ether resin, terpene phenol resin, xylene resin, epoxy resin, polyester resin, polyimide resin and polyamide resin.

6. The composition of claim 1, wherein the acrylic polymer has a weight average molecular weight of about 300,000 to 1,200,000.

7. The composition of claim 1, wherein the main component has a glass transition temperature of −65° to −30° C.

8. The composition of claim 1, wherein the main component has an elastic modulus of 0.2 to 30 kg/cm².

9. The composition of claim 1, wherein the composition further contains an anionic, cationic or nonionic surfactant in an amount of about 0.01 to 5 parts by weight per 100 parts by weight of the main component.

10. The composition of claim 1, wherein said acrylic polymer is an acrylic copolymer comprising about 90 to 98% by weight of an alkyl (meth)acrylate monomer having an average carbon atom number in a range of 3 to 12 in the alkyl moiety and about 10 to 2% by weight of a polymerizable monomer having a functional group in the molecule.

* * * * *